Figure 1:
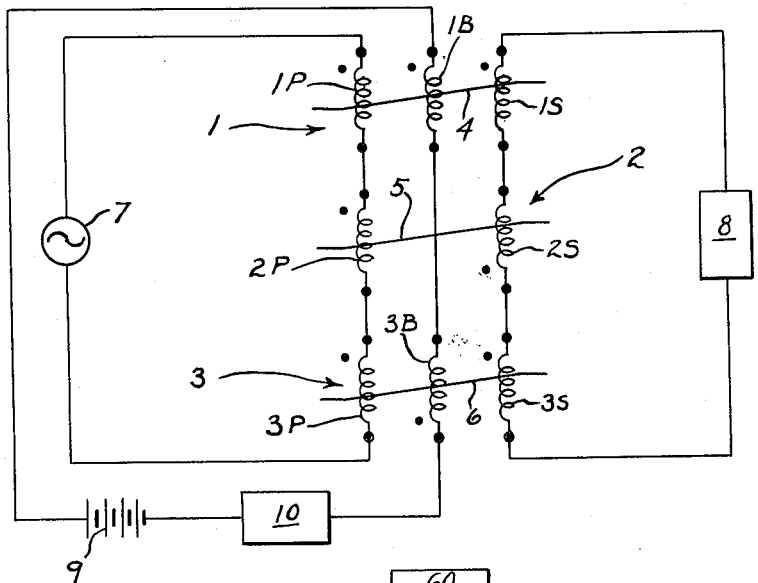

Jan. 11, 1966 B. R. BUDNY 3,229,192
STATIC FREQUENCY MULTIPLIER
Filed June 29, 1961 7 Sheets-Sheet 1

INVENTOR
BERNARD R. BUDNY

BY *Arthur H. Seidel*

ATTORNEY

Jan. 11, 1966  B. R. BUDNY  3,229,192
STATIC FREQUENCY MULTIPLIER
Filed June 29, 1961  7 Sheets-Sheet 3

INVENTOR
BERNARD R. BUDNY

BY
*Arthur H. Seidel*

ATTORNEY

Jan. 11, 1966  B. R. BUDNY  3,229,192
STATIC FREQUENCY MULTIPLIER
Filed June 29, 1961  7 Sheets-Sheet 4

INVENTOR
BERNARD R. BUDNY

BY
ATTORNEY

Jan. 11, 1966  B. R. BUDNY  3,229,192
STATIC FREQUENCY MULTIPLIER
Filed June 29, 1961  7 Sheets-Sheet 5

INVENTOR
BERNARD R. BUDNY

BY

ATTORNEY

Jan. 11, 1966 B. R. BUDNY 3,229,192
STATIC FREQUENCY MULTIPLIER
Filed June 29, 1961 7 Sheets-Sheet 6

INVENTOR
BERNARD R. BUDNY

BY

ATTORNEY

United States Patent Office 3,229,192
Patented Jan. 11, 1966

3,229,192
STATIC FREQUENCY MULTIPLIER
Bernard R. Budny, Milwaukee, Wis., assignor to Allen-Bradley Company, Milwaukee, Wis., a corporation of Wisconsin
Filed June 29, 1961, Ser. No. 120,699
12 Claims. (Cl. 321—68)

This invention relates to magnetic frequency changers and it more specifically resides in a static amplifier that is composed of a plurality of non-linear inductors having input and output windings which are premagnetized to different degrees of saturation so that when a voltage is applied to the input windings voltages are alternatively induced in the output windings whereby an increased frequency appears across the aggregate of the output windings.

The provision of a high frequency source is desirable for an increasing range of applications, and the present invention provides a static frequency multiplier that may be designed for any of a large number of multiplication ratios. The multiplier utilizes a number of non-linear magnetic inductors in which output voltages appear, during a cycle of the input voltage, successively across the inductors, and by proper polarity connections of the inductors an increase in output frequency is obtained over the input frequency. By varying the number of inductors employed the output frequency may be varied, and consequently a form of frequency multiplier is provided that can be utilized in a number of applications.

Typical applications could be loads such as fluorescent lights, high speed motors, magnetic amplifiers and supersonic transducers. Another application may lie in connection with inverters utilizing transistors and rectifiers for producing alternating current from a direct current source. The efficiency of such solid state inverters drops with increasing frequency output. The frequency multiplier described herein is well suited to efficiency multiply a square wave, such as developed by the inverters being discussed, and thus the invention may well find application in conjunction with low frequency inverters.

It is an object of this invention to provide a frequency multiplier that will give a large frequency multiplication and which can be designed for any of a large number of multiplication ratios.

It is another object of this invention to provide a frequency multiplier without any moving parts.

It is another object of this invention to provide a frequency multiplier which will efficiently operate from a single phase source.

It is another object to provide frequency multipliers that can be cascaded one with the other to obtain a frequency output that is the product of the individual multiplication ratios of the multipliers employed.

It is another object of this invention to provide static frequency multipliers utilizing premagnetized inductors in which premagnetizing may be accomplished by either alternating current, direct current or a permanent magnet material.

The foregoing and other objects and advantages of this invention will appear from the description to follow. In the description reference is made to the accompanying drawings, which form a part hereof, and in which there is shown by way of illustration and not of limitation a number of specific embodiments in which his invention may be embodied.

Figure 15:
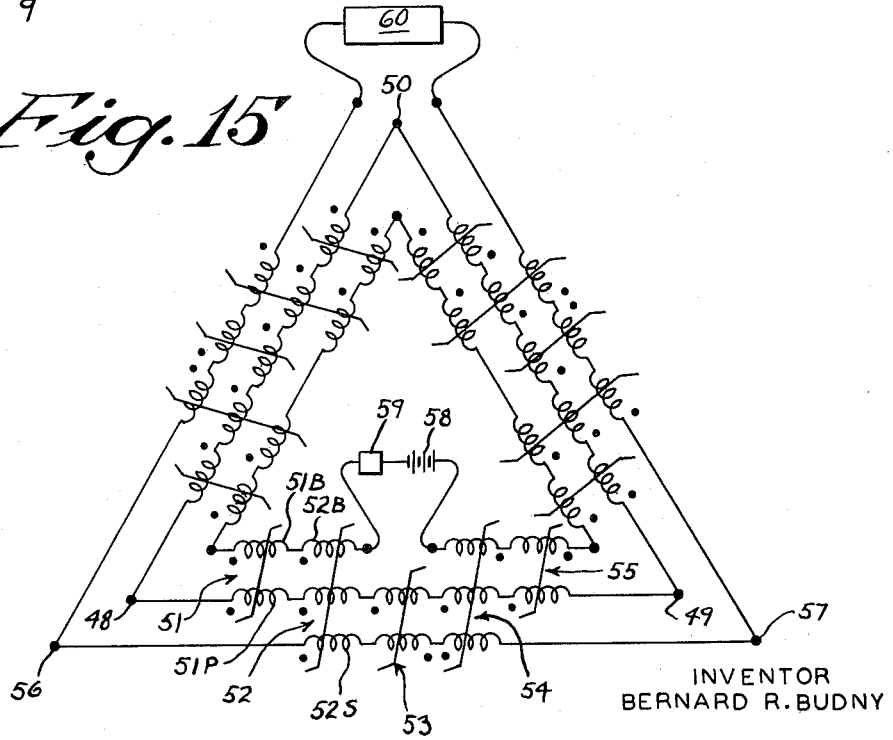
Figure 2:
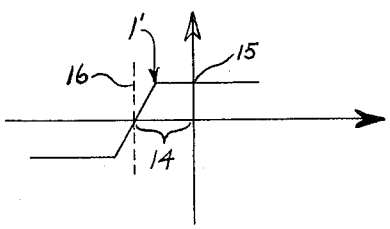
Figure 3:
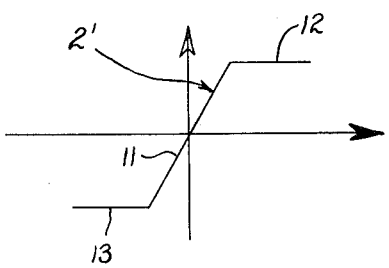
Figure 4:
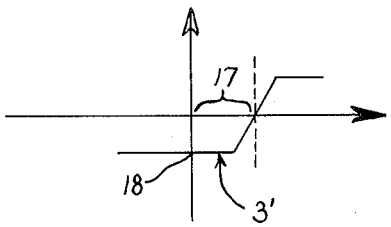
Figure 5:
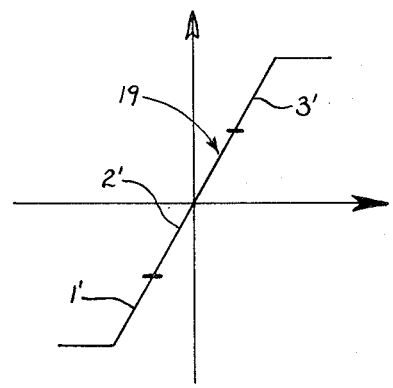
Figure 6:
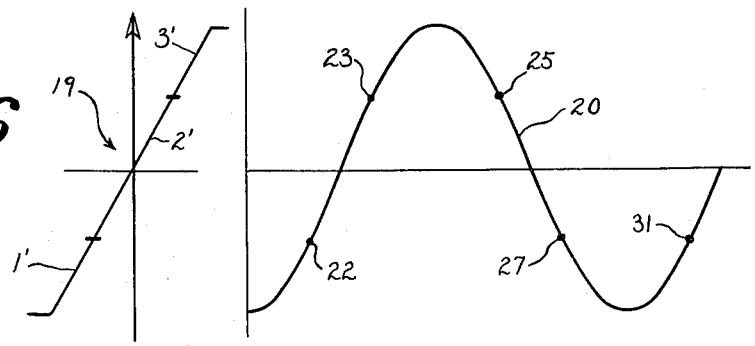
Figure 7:
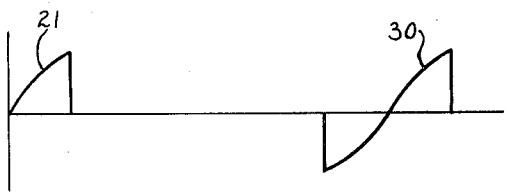
Figure 8:
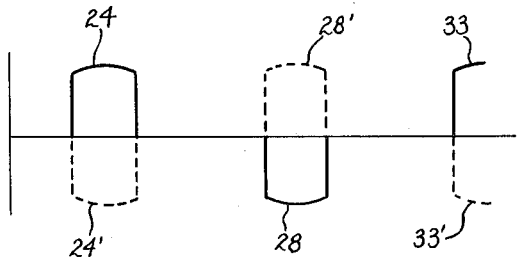
Figure 9:
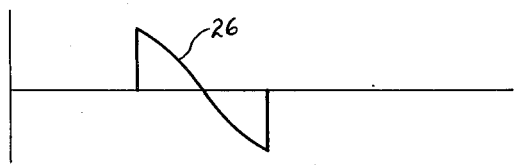
Figure 10:
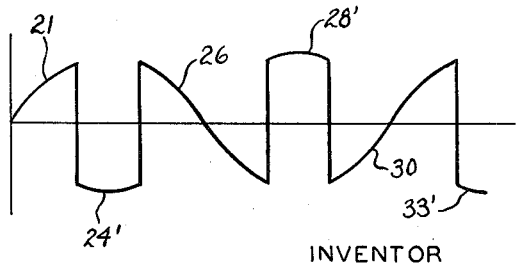
Figure 11:
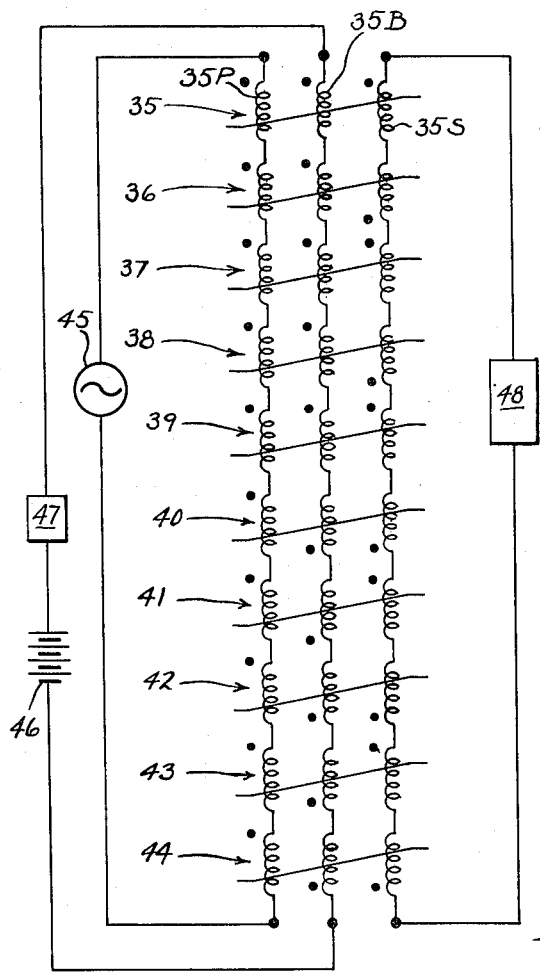
Figure 12:
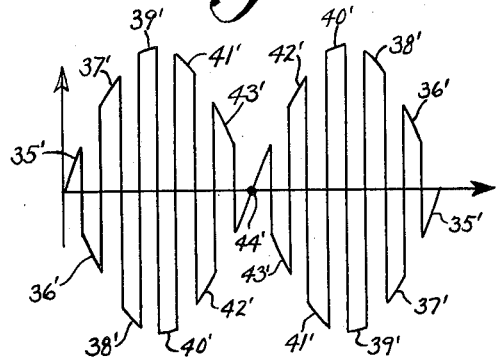
Figure 13:
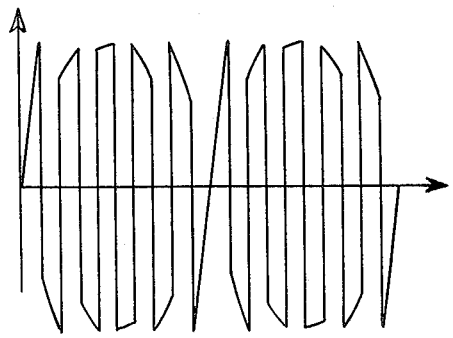
Figure 14:
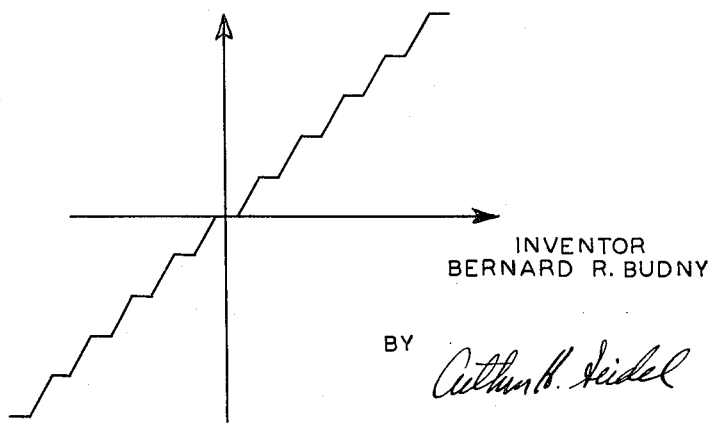
Figure 16:
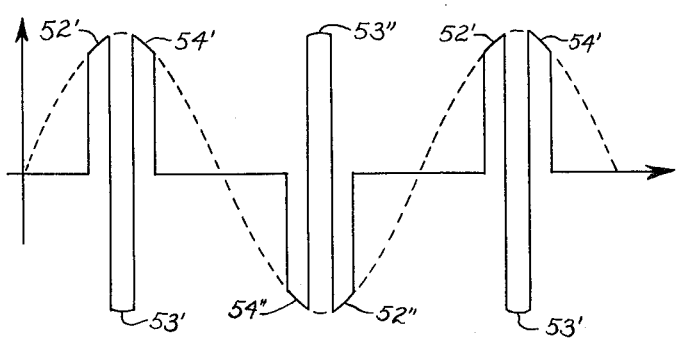
Figure 17:
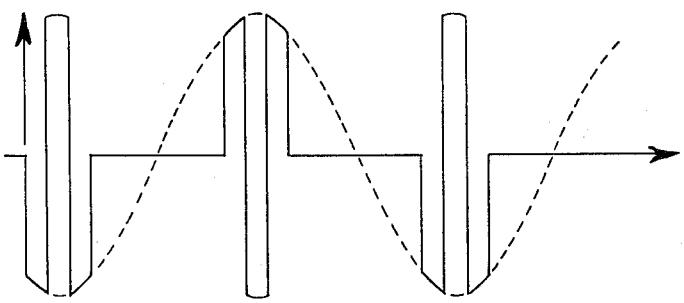
Figure 18:
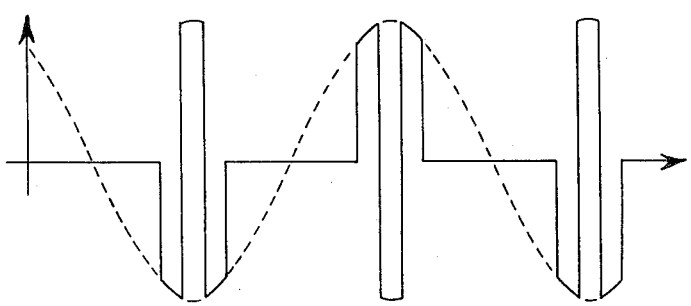
Figure 19:
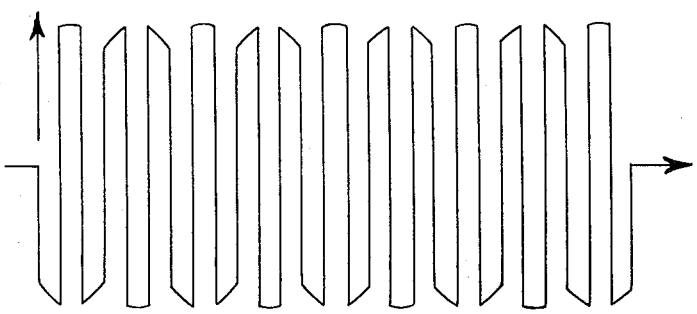
Figure 20:
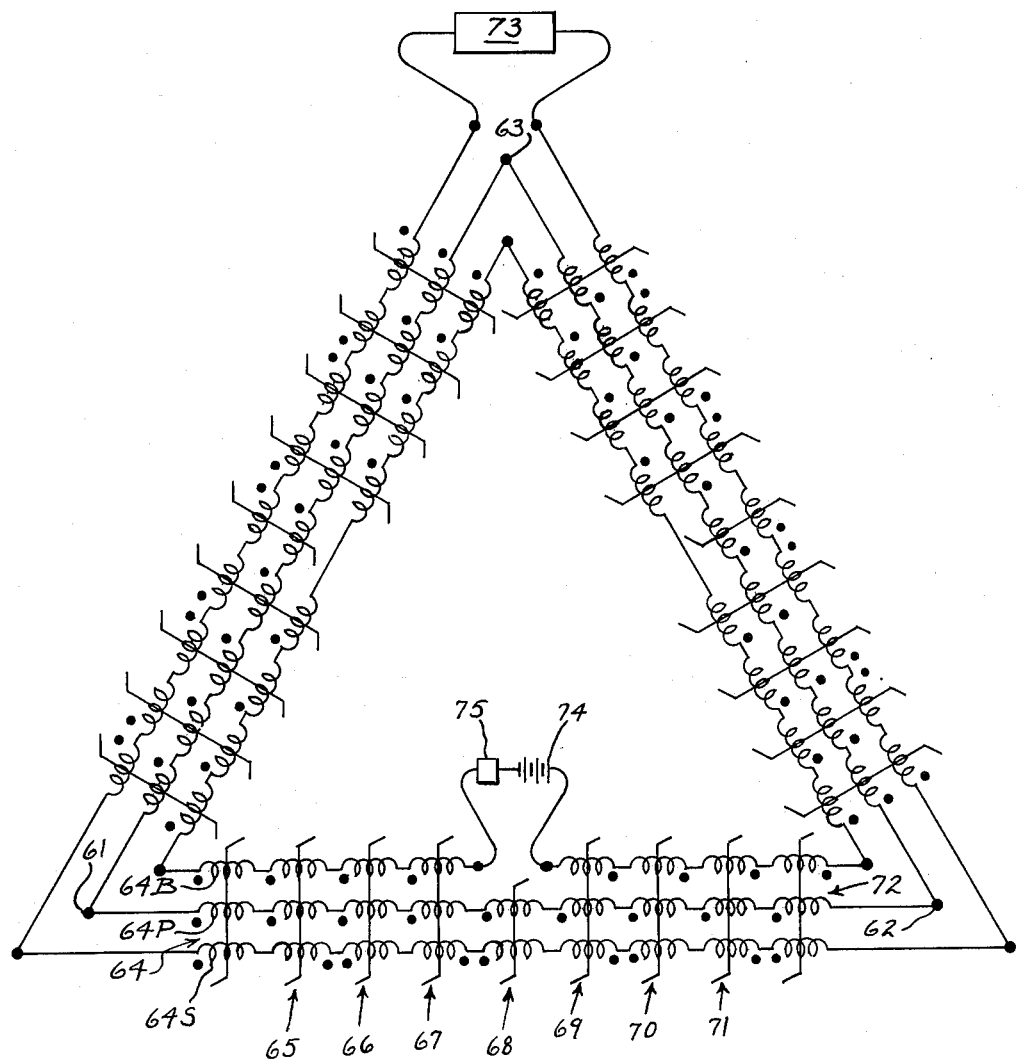
Figure 21:
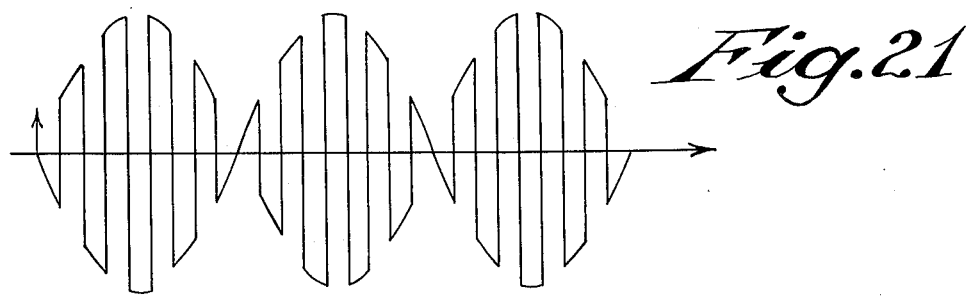
Figure 22:
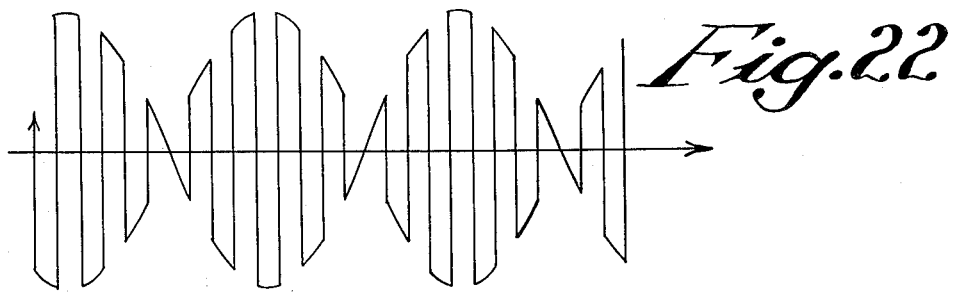
Figure 23:
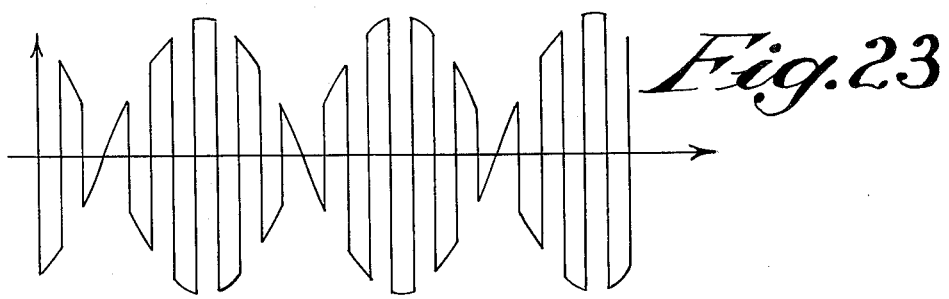
Figure 24:
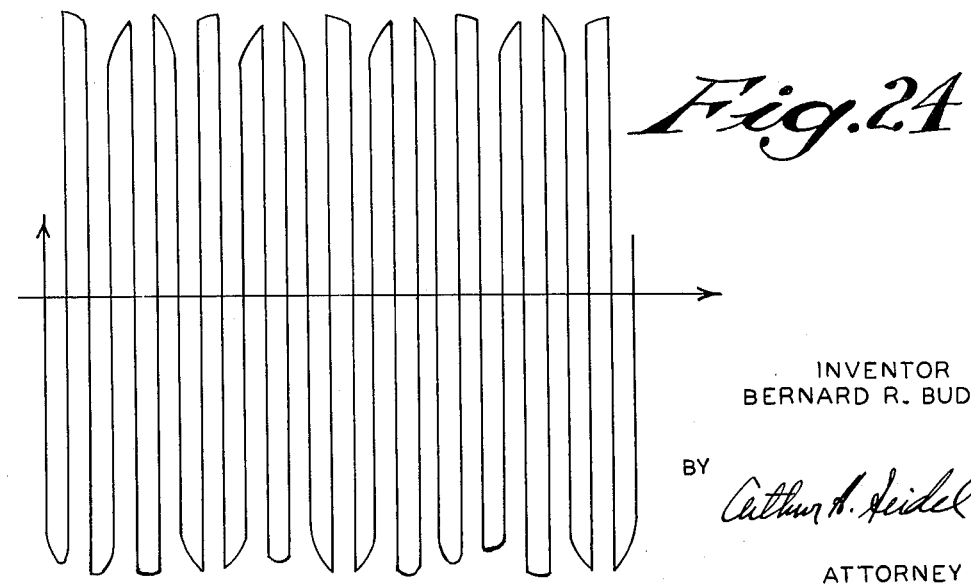

In the drawings:
FIG. 1 is a schematic wiring diagram of a frequency changer embodying the invention and adapted for tripling the frequency of a single phase input,
FIGS. 2–4 are magnetization curves for the inductors of the apparatus of FIG. 1,
FIG. 5 is a composite magnetization curve of the inductors of the apparatus of FIG. 1,
FIG. 6 is a graphical plot of a magnetic flux linkage wave supported by the inductors of the apparatus of FIG. 1, together with the composite magnetization curve of FIG. 5 at the left of the flux linkage wave,
FIGS. 7–9 are graphical plots of output voltages appearing across the inductors of the apparatus of FIG. 1,
FIG. 10 is a graphical plot of the summation of the voltages in FIGS. 7–9,
FIG. 11 is a schematic wiring diagram of a frequency multiplier embodying the invention for obtaining a frequency output ten times that of the input voltage,
FIG. 12 is a graphical plot of the output voltage for the apparatus of FIG. 11,
FIG. 13 is a graphical plot of a modification of the output voltage for the apparatus of FIG. 11,
FIG. 14 is a composite magnetization curve for the apparatus of FIG. 11,
FIG. 15 is a schematic wiring diagram of a frequency multiplier embodying the invention adapted for connection to a three phase source and for obtaining a frequency output nine times that of the input frequency,
FIGS. 16–18 are graphical plots of output voltages for the phases of the apparatus of FIG. 14,
FIG. 19 is a graphical plot of the summation of the output voltages of FIGS. 16–18,
FIG. 20 is a schematic wiring diagram of another three phase multiplier embodying the invention,
FIGS. 21–23 are graphical plots of output voltages of the phases of the apparatus of FIG. 20, and
FIG. 24 is a graphical plot of the summation of the output voltages of FIGS. 21–23.

Referring now to the drawings, there is shown in FIG. 1 a static frequency changer of the invention comprising a set of three non-linear inductors 1, 2 and 3 having magnetic frames, or cores, that are schematically represented by the partially oblique lines 4, 5, and 6. The magnetic frames 4, 5 and 6 will be comprised of magnetic materials shaped in suitable geometry, as well known in the reactor and magnetic amplifier art, to support and be linked by a set of input windings 1P, 2P and 3P respectively, and a set of output windings 1S, 2S and 3S respectively. The frames 4 and 6 of the inductors 1 and 3 also carry bias windings 1B and 3B respectively.

The input windings 1P, 2P and 3P are connected in series, as shown, and for the purpose of discussing the operation of the apparatus polarity marks have been applied in FIG. 1 to the upper end of each of the input windings. The bias windings 1B and 3B are connected to one another in such manner that the polarities of these windings (as indicated by the polarity markings in FIG. 1) establish, for a common current flowing therethrough, a magnetic flux in inductor 1 in one directional sense with respect to the input winding 1P and a magnetic flux in inductor 3 in the opposite directional sense with respect to the input winding 3P. The output windings 1S, 2S and 3S are joined to one another in series and the connections for these windings are such that the polarity of the output winding 2S is opposite in sense to the polarity of the output windings 1S and 3S. This is represented in FIG. 1 by the polarity markings that have been placed beside these particular windings 1S–3S. Hence, if an exciting current were to flow through input windings 1P, 2P and 3P, without any control currents flowing through windings 1B and 3B voltages would be induced across the windings 1S, 2S and 3S with the voltage across the winding 2S reversed in polarity from the voltages appearing across the windings 1S and 3S.

The input windings 1P, 2P and 3P are connected across an A.C. voltage source 7 of a frequency that is to be multiplied by the apparatus being described. The output windings 1S, 2S and 3S are connected across a load 8 to which a composite output voltage of a frequency three times that of the source 7 will be applied. The bias windings 1B and 2B are connected to a source of D.C. control current 9 through a high impedance 10, so that a premagnetizing direct current will flow through the windings 1B and 3B that is relatively constant in value.

Referring now to FIG. 3, there is shown therein an ideal magnetization curve 2' for the inductor 2 with the ordinate measured in flux linkage and the abcissa in amperes. For an "ideal" curve the unsaturated region is represented by an oblique straight line 11 and the saturated regions by the horizontal lines 12 and 13.

Referring now to FIG. 2, there is shown an ideal magnetization curve 1' for the inductor 1 with a premagnetizing direct current flowing through the bias winding 1B to establish a premagnetizing amperes of the amount shown by the bracket 14. This premagnetizing bias places the magnetic frame 4 of the inductor 1 in a state of saturation, so that for alternating components of flux linkage and current the initial, or zero, point of operation is that point designated by the reference numeral 15. The dotted line 16 represents the ordinate for zero amperes of magnetization without premagnetization.

Referring now to FIG. 4, there is shown an ideal magnetization curve 3' for the magnetic frame 6 of the inductor 3, and for a direct current premagnetizing current flowing through the winding 3B the magnetic frame 6 is placed in a state of magnetic saturation by the direct current amperes represented by the bracket 17. The initial point of operation for the A.C. components of flux linkage and current is designated by the reference numeral 18, and it is seen that the sense of premagnetizing saturation for the inductor 3 is the opposite sense, that is negative, with respect to that of the inductor 1.

FIG. 5 is a composite magnetization curve 19 for the three inductors 1, 2 and 3 which is obtained by adding the flux linkage ordinates, and it is seen that the summation for the three non-linear inductors 1, 2 and 3 results in an overall magnetization curve of non-linear characteristic in which the unsaturated region is comprised of the unsaturated regions of the magnetization curves 1', 2' and 3', and these individual regions are accordingly designated by the respective reference numerals 1', 2' and 3'. It is further seen from FIG. 5 that the amount of direct current premagnetization has been selected so that the unsaturated regions of the three frames 4, 5 and 6 are displaced with respect to one another along the abcissa so that they will fall in end to end alignment without overlapping, whereby only one of the inductors, 1, 2 or 3 can support an alternating component of flux at any given time. Thus, for a zero point of magnetomotive force on the composite curve 19 the unsaturated curve portions of the cores 1 and 3 are displaced entirely from such zero point.

Turning now to FIG. 6 the composite curve 19 of FIG. 5 is reproduced, and to the right of the curve 19 there is a plot of a flux linkage wave 20, as may be had when the input windings 1P, 2P and 3P are connected across the source 7. Assuming the source voltage 7 to be sinusoidal, then the total alternating flux linkage that must be supported by the inductors 1, 2 and 3 will also be sinusoidal in character, but displaced ninety degrees in time with respect to the voltage. The wave 20 is representative of such an alternating flux linkage. Commencing at the left hand end of the wave 20, the initial large negative values of flux linkage will retain the inductors 2 and 3 in a state of saturation, so that they will not support the alternating flux. The magnetic frame 4 of the inductor 1, however, is driven into its unsaturated state and will operate over the oblique portion of its magnetization curve. Hence, the inductor 1 supports the A.C. component of flux and a voltage will be induced across the output winding 1S. This induced voltage across the winding 1S is represented in FIG. 7 by the curve portion 21.

As the A.C. component of flux linkage passes beyond the point 22 of the curve 20 the frame 4 of the inductor 1 becomes saturated in the opposite sense from that state of saturation set up by the premagnetization of its bias winding 1B so that it no longer supports the alternating flux. At this point the frame 5 of the inductor 2 enters its unsaturated state and from the point 22 to the point 23 of the flux linkage wave 20 it supports the alternating flux whereby a voltage is induced in the output winding 2S. This voltage appearing across the winding 2S is represented in FIG. 8 by the curve portion 24, and since the polarity connection for the winding 2S is opposite in sense to that of the output winding 1S the voltage appearing across the winding 2S is inverted with respect to the output voltage of the inductor 1 as seen from the load 8. This inversion is represented in FIG. 8 by the dotted line 24'.

As the alternating flux linkage wave 20 progresses past the point 23 to the point 25 the magnetic frame 5 of the inductor 2 is saturated and the frame 6 of the inductor 3 solely supports the alternating flux whereby, a voltage 26 shown in FIG. 9 is induced across the output winding 3S. This induced voltage 26 is of a polarity opposite in sense to that which appeared across the output winding 2S, so that as the inductors 1, 2 and 3 have successively and in turn been driven into and out of their unsaturated states the polarities of the respective output voltages have reversed with respect to one another.

As the flux linkage wave passes beyond the point 25 to the point 27 the inductor 2 again supports the alternating flux to present an output voltage across its winding 2S that is represented by the curve portion 28 in FIG. 8, and this voltage is reversed in polarity as represented by the dotted line 28'. When the inductor 2 passes into a state of saturation at the point 27 the inductor 1 again takes over as the support for the alternating flux, and the voltage represented by the curve portion 30 in FIG. 7 appears across the output winding 1S. Next, as the flux moves past its curve point 31 the inductor 2 again supports the alternating flux to present the voltage represented by the curve portion 33 in FIG. 8, and this in its inverted polarity is represented by the dotted curve portion 33'.

Turning now to FIG. 10, there is shown therein the summation of the several induced voltages appearing across the output windings 1S, 2S and 3S as presented to the load 8. Since the output winding 2S of the inductor 2 presents voltages reversed in polarity the resultant output voltage for the particular embodiment of FIG. 1 is three times that of the input frequency. The invention particularly lends itself to a substantial number of multiplication ratios for the input frequency, and there is shown in FIG. 11 a frequency multiplier utilizing a set of ten non-linear, magnetic inductors 35 through 44 to obtain an output frequency ten times that of the input frequency. The inductors 35–44 each comprise a magnetic frame, or core, which supports an input winding, an output winding and a bias winding, such as are, by way of example, designated 35P, 35S and 35B for inductor 35. The relative polarities of the inductor windings are designated in FIG. 11 by the polarity markings shown. The input windings are connected in series with one another and are across an A.C. voltage source 45, and for purposes of reference the polarity mark for each of the input windings has been placed at its upper end.

The bias windings for the inductors 35–44 are joined in series and are connected as a group across a D.C. premagnetizing current source 46 and an impedance 47 that serves to maintain the premagnetizing current relatively constant. It will be observed from the polarity markings applied to the bias windings, that the first five inductors 35–39 are premagnetized in one directional sense with respect to the input windings and the other five inductors 40–44 are premagnetized in the opposite directional sense. The number of turns selected for each control winding is such that for the common premagnetization current each inductor frame is premagnetized into a saturated state. The degree of saturation varies so that the linear portions of the individual magnetization curves do not overlap when the ordinates of such individual curves are added to one another. This is similar as in connection with the apparatus of FIG. 1, so that when an A.C. voltage is applied across the input windings of the inductors 35–44 they will successively and in turn operate through their unsaturated states, so that they alternately support the alternating flux accompanying the A.C. input voltage.

The output windings of the inductors 35–44 are connected in series with one another across a load 48, and as shown in FIG. 11 the relative polarities for the output windings are such that they alternate to have successive induced voltages that appear across the output windings, and as viewed from the load 48, reverse in polarity, similarly as occurred in connection with the description of the apparatus of FIG. 1.

In FIG. 12 there is shown an output voltage representative of that obtainable from the apparatus of FIG. 11 and which will appear across the inductor output windings for one cycle of input voltage. It is seen that the output frequency is ten times that of the voltage source 45. In explanation of the curve of FIG. 12, the alternating flux linkage that must be supported by the magnetic frames of the inductors 35–44 is assumed as commencing at a peak value, and it is further assumed that at this peak value the inductor 35 is driven into the unsaturated portion of its magnetization curve, while the remaining inductors 36–44 remain saturated. The curve segment 35′ at the left hand side of FIG. 12 will then represent the output voltage appearing across the output winding of the inductor 35. As the alternating flux linkage decreases in value the inductor 36 enters its unsaturated magnetic state and the inductor 35 becomes saturated, so that the voltage curve segment 36′ will represent the voltage appearing across the output winding of the inductor 36 during the short time interval while the inductor 36 is the sole unsaturated inductor. It will be observed that the voltage portion 36′ is negative with respect to the voltage portion 35′, which is due to the reverse polarity of the output winding of the inductor 36 with respect to that of the inductor 35.

Next, the inductor 37 will become unsaturated and the inductor 36 will return to a saturated state, wherefor the voltage portion 37′ will represent the short period of output voltage appearing across the output winding of the inductor 37. This voltage is of reverse polarity with respect to the preceding voltage 36′, as indicated by the polarity markings in FIG. 11. In similar fashion the remaining inductors 38–44 will successively, in turn, become unsaturated so as to successively support the alternating flux and to develop successive output voltages across their successive output windings which alternate in polarity. The voltages induced have been indicated in FIG. 12 by reference numerals identical to the inductors producing the induced output voltages, with the addition of a prime mark. Since the successive output windings, which alternately in turn present the output voltages, are opposite in polarity there is a rapid reversal through zero value as a transition is made from inductor to inductor to produce a frequency change which is ten times that of the input frequency.

The output voltage shown in FIG. 12 has the appearance of an amplitude modulated wave. By adjustment of the turns ratios between input and output windings of the inductors this appearance can be altered, and as an example a substantially constant amplitude of ten times the input frequency can be achieved as shown in FIG. 13. Further, it has been found that loading effects encountered during operation are accompanied by transient phenomena that act to produce shifts of the unsaturated portions of the magnetization curves of the inductors. Such shifts occur along the abscissa, or current coordinates, of the curves so that a continuous straight line for the unsaturated portion of the composite magnetization curve, as shown in FIG. 5, is not maintained during loading. Overlapping of the individual unsaturated states may occur and this impairs frequency multiplication. To overcome this objection the premagnetization bias values may be increased to develop a disjointed composite curve as shown in FIG. 14, and as long as loading is not excessive frequency multiplication will be maintained.

The frequency multiplier of the invention is also applicable to multiple phase input voltages, and in FIG. 15 there is shown by way of illustration a frequency multiplier for connection to a three phase source and a single phase load in which the multiplier will have an output frequency nine times that of a single input phase. A set of three input terminals 48, 49 and 50 are shown in FIG. 15 for connection to a three phase voltage source and between each set of input terminals there is connected in series the input windings of a set of non-linear magnetic inductors. Thus, between terminals 48 and 49 there is a set of five inductors 51 through 55 that each have an input winding such as that designated 51P for the inductor 51. The three center inductors 52, 53, 54 are similar to the three inductors of FIG. 1 with each having an output winding (such as 52S) and inductors 52 and 54 having a bias winding (such as 52D). The additional inductors 51 and 55 do not carry output windings, but do have bias windings (such as 51B) that are in series with the bias windings of the inductors 52 and 54 and which receive a bias current from a D.C. source 58 and an appropriate impedance 59. The three output windings of the inductors 52, 53 and 54 are connected in series with one another and are across a pair of end terminals 56 and 57.

As shown by the polarity markings in FIG. 15, the bias windings are arranged to have the inductors 51 and 52 magnetically biased in one directional sense with respect to the input windings and to have the inductors 54 and 55 magnetically biased in the opposite directional sense. The degrees of premagnetization are, as in the embodiments of FIGS. 1 and 11, of such magnitudes as to have the unsaturated states of the five inductors 51–55 offset so that upon application of an A.C. voltage across the input windings the inductors will successively and alternately, in turn, be driven into and out of their unsaturated states. The polarity markings for the output windings of the inductors 52, 53 and 54 are such that as alternating magnetic flux is supported alternately by those inductors the induced voltages alternate in polarity, similarly as in the other embodiments of FIGS. 1 and 11.

As is readily apparent from FIG. 15 groups of inductors are connected between the input phase terminals 49–50 and 50–48 similarly as between the terminals 48–49. Also, all of the output windings of all the inductors are connected in series with one another to be joined across a load 60, and all of the bias windings are connected in series to receive a bias current from the D.C. source 58.

Referring now to FIG. 16, there is shown the output voltage that appears across the output windings of inductors 52–54. For the first 60° of the cycle of the input voltage across the phase terminals 48–49 the output voltage is zero. This is a time interval in which the inductor 51, that has no output winding, is the only inductor of the phase in its unsaturated state, so that it supports the alternating flux. Since there is no secondary winding to develop an induced output voltage there is no voltage presented to the output circuit by the phase across the terminals 48–49. At the end of the 60° interval inductor 51 becomes saturated and the inductor 52 becomes the sole unsaturated inductor for the phase 48–49. The inductor 52 presents a short voltage pulse 52′. Then, the inductor 53 becomes unsaturated and it presents the next voltage pulse 53′, after which the inductor 54 becomes unsaturated and presents the voltage pulse 54′.

For the next 120° the inductor 55 is unsaturated to support the alternating flux, and since this inductor has no output winding the voltage presented by the phase 48–49 is again zero. During the next 60° the three inductors 52–54 successively alternate in becoming unsaturated to present the voltage pulses 54″, 53″ and 52″. For the next 120° the indicator 51 is unsaturated and the output voltage of the phase is zero, then for the next 60° of the half cycle the inductors 52–54 alternate successively to repeat the voltage pulses 52′, 53′ and 54′.

FIG. 17 represents the voltage output for the inductors across the phase 49–50, and FIG. 18 represents the voltage output for the inductors across the phase 50–48. As is observed from these figures the phases present output voltages during alternate 60° intervals and the summation of the output voltage of the three phases is shown in FIG. 19, wherein there is shown a frequency output nine times the frequency of a single input phase. The principle described in connection with the apparatus of FIG. 15 may be extended to different numbers of input phases, and if desired the inductors such as 51 and 55 without output windings can be eliminated, in which event each phase completely divides the entire cycle and a number of inductors is selected to achieve this result.

An example of the elimination of inductors such as 51 and 55 is illustrated in the schematic wiring diagram of FIG. 20, where there is shown a multiplier for connection to a three phase voltage source that produces a single phase output of a frequency nine times that of the input frequency. There are three input terminals 61, 62 and 63 and between each set of terminals is a group of nine inductors, such as numbers 64–72 between terminals 61 and 62. The inductors 64–72 has input windings, such as 64P, output windings such as 64S, and bias windings such as 64B. The inductor 68 has no bias winding, and in this respect is similar to the inductor 2 of FIG. 1.

The output windings of the multiplier of FIG. 20 are connected in series to a load 73 and a direct current source 74 and impedance 75 are provided for the bias windings. Each of the sets of inductors between a pair of input terminals operates similarly as the multiplier of FIG. 1, except that the use of nine inductors in a set produces an output frequency nine times that of the input frequency.

FIG. 21 shows the output voltage that will be obtained from the inductors 64–72. FIG. 22 shows the output voltage for the inductors between the terminals 62 and 63, and FIG. 23 shows the output voltage for the inductors between the terminals 63 and 61. The load 73 has the summation of these voltages impressed upon it, and this summation is shown in FIG. 24, which represents the output voltage for the complete multiplier of FIG. 20.

The invention provides a versatile means of multiplying a given frequency through the use of non-linear magnetic inductors in which premagnetizing bias is provided to saturate inductors at different levels so that upon application of an A.C. voltage the exciting current will successively drive the inductors into their unsaturated states whereby they alternate, in turn, to present induced output voltages of alternate polarity. Three or more inductors are utilized for any input phase, and at least two of the inductors are saturated well beyond the unsaturated states so that the unsaturated conditions will not overlap upon application of an A.C. input voltage. In usual applications of the invention at least two reactors present unsaturated conditions to each side of the zero point for A.C. magnetomotive forces, and for odd number multiplication ratios one of the inductors has the center point of its unsaturated state coincident with the zero point of the A.C. magnetomotive forces.

The invention presents a magnetic frequency changer that can readily be designed for any of a large range of multiplication ranges, and can be applied to either single or multiple phase inputs. In addition, it lends itself to cascading, and is efficient in nature.

I claim:

1. In a magnetic frequency changer the combination comprising: a set of several non-linear inductors each having a saturable magnetic core with associated input windings and output windings on the core; connections joining said input windings in series for connection across a single phase of an A.C. source of alternating voltage; at least all but one of said several inductors having associated magnetic bias means that magnetically bias their associated magnetic cores into a state of saturation such that each of the unsaturated magnetic curve portions of these cores is displaced entirely to one side of a zero magnetomotive force value and is also displaced with respect to the magnetic curves of the other cores so that an application of A.C. voltage across said input windings will successively by turn drive the cores into and out of their unsaturated states with more than one inductor being driven into an unsaturated state during each half cycle of applied voltage; and connections joining said output windings in series with the polarities thereof such that electrically adjacent windings, with respect to successive unsaturation, are opposite whereby successive voltages induced in said output windings are of opposite polarity.

2. In a magnetic frequency changer the combination comprising a group of several non-linear inductors having saturable cores, input windings, output windings and magnetic bias means that place cores in differing degrees of saturation whereby each core has the unsaturated portion of its magnetizing curve entirely offset from the other cores; connections joining the input windings with one another whereby application of a single phase of an A.C. source successively drives the inductors in turn into and out of their unsaturated states with more than one inductor being driven into an unsaturated state during each half cycle of applied voltage; and connections for the output windings placing windings of successive inductors in reverse polarity with respect to one another.

3. In a magnetic frequency changer the combination comprising: a set of several non-linear inductors each with a saturable magnetic core and associated input, output and bias windings on the core; connections joining the input windings in series, for connection across a single phase of an A.C. source; connections joining said bias windings in series, for connection to a source of control current, with such windings being divided into a first group having polarities in one direction with respect to their associated input windings and a second group having opposite polarities with respect to their associated input windings, said bias windings providing ampere turns that magnetically bias the cores to have the unsaturated portions of the magnetic characteristic curves of the related cores fall within different ranges of ampere values whereby application of an A.C. voltage to the input windings alternately by turn drives the cores into and out of their unsaturated states; and connections joining the output windings in series with the polarity of adjacent output windings, with respect to alternate unsaturation, being alternate with respect to the input windings.

4. A magnetic frequency changer as in claim 3 with a direct current source and an impedance connected to the bias windings.

5. In a magnetic frequency changer the combination comprising: a set of several non-linear magnetic cores; input windings on each of said cores that are connected in series for connection to a single phase of an A.C. source and are adapted to apply A.C. amperes to the cores; magnetic bias means for said cores adapted to premagnetize the same and to place the magnetic state of each core at a point on its saturation curve that is different from the points of the other cores, wherein each core will be unsaturated for different A.C. ampere values than the other cores and wherein a first group of cores have one polarity for their premagnetizing magnetic flux with respect to their input windings and a second group have the opposite polarity for their premagnetizing magnetic flux; and output windings on each of said cores connected in series with the polarity sense of the windings of cores in each group alternating with respect to the input windings.

6. In a magnetic frequency changer the combination comprising: a plurality of non-linear magnetic cores having saturated and unsaturated magnetic states; input windings on the cores for connection to a single phase of an A.C. source; magnetic bias means for the cores placing each core in a magnetic state at a point of saturation different from the other cores with a first group of cores being saturated in one polarity sense with respect to their input windings and a second group of cores being saturated in the opposite polarity sense with respect to their input windings whereby an A.C. input applied to said input windings will drive said cores successively into unsaturated condition and each group thereof supports A.C. flux during a half cycle with the cores of the group supporting the flux in turn one after another; and output windings on the cores connected with one another and disposed about the cores to have polarity senses with respect to the input windings that alternate, in each group, as progression is made from any given core to the core of the next point of saturation.

7. A device in accordance with claim 6 in which said magnetic bias means comprise bias windings for said cores and a current source of steady state current.

8. In a static frequency changer the combination comprising: a plurality of non-linear magnetic inductors; input windings on the inductors joined in series for connection to a single phase of an A.C. source; each inductor having premagnetizing bias means placing the magnetic state thereof at a point along its magnetization curve different from the other inductors, with the inductors being divided into a first group with a magnetic bias in one directional sense along their magnetization curves and a second group with a magnetic bias in the opposite directional sense along their magnetization curves, the inductors presenting a composite magnetization curve with adjacent unsaturated portions of the curve being comprised of the individual unsaturated curve portions of the inductors; and output windings on the reactors joined to one another with the polarities thereof, with respect to the input windings, alternating for magnetically adjacent inductors of the composite magnetization curve.

9. In a magnetic frequency changer the combination comprising: a first inductor having a magnetic frame and input and output windings; a second inductor having a magnetic frame, an input winding connected to the input winding of the first inductor, a bias winding for premagnetizing the frame to offset the unsaturated state with respect to the first inductor to a different range of amperes, and an output winding; a third inductor having a magnetic frame, an input winding connected to the input windings of the other inductors for connection to a single phase of an A.C. source, a bias winding for premagnetizing the frame to offset the unsaturated state with respect to the first inductor to a different range of amperes and in a polarity sense opposite from the second reactor, and an output winding; and connections for said output windings joining the windings of the second and third reactors in a polarity sense opposite that of the output winding of the first reactor.

10. In a magnetic frequency changer the combination comprising: a first inductor having a magnetic frame and input and output windings; a first group of inductors each having a magnetic frame, an input winding, a bias winding for premagnetizing the frame to offset the unsaturated state with respect to the first inductor and each of the other inductors of the first group, such that each inductor will be unsaturated for different ranges of value of A.C. excitation across the input windings, and an output winding; a second group of inductors each having a magnetic frame, an input winding, a bias winding for premagnetizing the frame to offset the unsaturated state with respect to the first inductor and each of the other inductors of the second group, such that each inductor will be unsaturated for different ranges of value of A.C. excitation across the input windings and will have a magnetic bias opposite in sense from the first group of inductors, and an output winding; connections joining all said input windings in series for connection across a single phase of an A.C. source; and connections for said output windings joining the windings in alternate polarity senses.

11. In a magnetic frequency changer for multiphase input the combination comprising: a first set of several non-linear inductors each having a saturable magnetic core with associated input windings that are joined to one another for connection across a single phase of an A.C. source; at least all but one of said several inductors of said first set of inductors having associated magnetic bias means that magnetically bias their associated magnet cores into a state of saturation so that an application of voltage across said input windings will successively by turn drive the cores into and out of their unsaturated states; output windings linking said cores except for at least two of the cores and having opposite polarities for successive cores driven into and out of unsaturated states; and additional sets of non-linear inductor similar to said first set for connection of the input windings of each set across a separate phase of the A.C. source.

12. In a magnetic frequency changer for multiphase input the combination comprising: a first set of several non-linear inductors having saturable magnetic cores with input windings for connection across a single phase of an A.C. source, bias means that magnetically bias cores into differing states of saturation so that the unsaturated states of the cores are offset from one another, and output windings; and additional non-linear inductor sets each for remaining separate phases of the A.C. source to which the frequency changer is to be attached.

References Cited by the Examiner

UNITED STATES PATENTS

| | | | |
|---|---|---|---|
| 2,666,178 | 1/1954 | Kramer | 321—68 |
| 2,820,942 | 1/1958 | Depenbrock | 321—68 |
| 2,953,736 | 9/1960 | Kellogg | 321—7 |

FOREIGN PATENTS 1,049,493  1/1959  Germany.

LLOYD McCOLLUM, *Primary Examiner.*

SAMUEL BERNSTEIN, *Examiner.*